(12) United States Patent
Liang et al.

(10) Patent No.: US 11,370,663 B1
(45) Date of Patent: Jun. 28, 2022

(54) METHOD FOR PRODUCTION OF NITROGEN-DOPED SINGLE WALL CARBON NANOHORNS FROM ANODE GRAPHITE OF WASTED LITHIUM-ION BATTERIES

(71) Applicant: KUNMING UNIVERSITY OF SCIENCE AND TECHNOLOGY, Kunming (CN)

(72) Inventors: Feng Liang, Kunming (CN); Zhipeng Xie, Kunming (CN); Zhenggang Tang, Kunming (CN); Xiecheng Yang, Kunming (CN); Da Zhang, Kunming (CN); Minjie Hou, Kunming (CN); Yao Kang, Kunming (CN); Bin Yang, Kunming (CN); Yongnian Dai, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 17/548,606

(22) Filed: Dec. 13, 2021

(30) Foreign Application Priority Data

Dec. 16, 2020 (CN) .......................... 202011486809.1

(51) Int. Cl.
*C01B 32/18* (2017.01)
*H01M 10/0525* (2010.01)
*H01M 4/583* (2010.01)
*H01M 10/54* (2006.01)

(52) U.S. Cl.
CPC ............ *C01B 32/18* (2017.08); *H01M 4/583* (2013.01); *H01M 10/0525* (2013.01); *H01M 10/54* (2013.01); *C01P 2002/54* (2013.01)

(58) Field of Classification Search
CPC .............................. C01B 32/18; C01B 32/00
See application file for complete search history.

(56) References Cited

U.S. PATENT DOCUMENTS

2017/0217841 A1 * 8/2017 Going .................... C04B 38/00

OTHER PUBLICATIONS

Vasu et al., "Single-walled nanohorns and other nanocarbons generated by submerged arc discharge between carbon electrodes in liquid argon and other media", Materials Research Express, 1015001 (2014) (Year: 2014).*

* cited by examiner

*Primary Examiner* — Amanda C. Walke (57) ABSTRACT

The present disclosure relates to a method for production of nitrogen-doped single wall carbon nanohorns from anode graphite of wasted lithium-ion batteries. The method includes the following steps: a first step: forming recycled graphite powder into graphite blocks; and, a second contact step: when the first step is completed, using a DC arc plasma device to produce the graphite blocks into N-SWCNHs.

17 Claims, 5 Drawing Sheets

---

Recovery of anode graphite: immersing negative electrodes of the lithium-ion batteries in water for a first preset time; then separating copper foil of the negative electrode from the graphite to obtain a mixture solution including the graphite, the mixture solution is subjected to solid-liquid separation treatment and washing by washing liquid to obtain solid graphite, and the solid graphite is subjected to particle refining treatment to obtain recycled graphite powder;

↓

Preparation of graphite blocks: molding the recycled graphite powder to obtain recycled graphite blocks;

↓

Preparation of carbon nanohorns: putting graphite blocks as an anode into a DC arc plasma device, a graphite rod sharpened at one end as a cathode and is arranged opposite to the graphite blocks, filling the plasma device with preset gas, and then starting the plasma device to synthesis carbon nanohorns.

Recovery of anode graphite: immersing negative electrodes of the lithium-ion batteries in water for a first preset time; then separating copper foil of the negative electrode from the graphite to obtain a mixture solution including the graphite, the mixture solution is subjected to solid-liquid separation treatment and washing by washing liquid to obtain solid graphite, and the solid graphite is subjected to particle refining treatment to obtain recycled graphite powder;

Preparation of graphite blocks: molding the recycled graphite powder to obtain recycled graphite blocks;

Preparation of carbon nanohorns: putting graphite blocks as an anode into a DC arc plasma device, a graphite rod sharpened at one end as a cathode and is arranged opposite to the graphite blocks, filling the plasma device with preset gas, and then starting the plasma device to synthesis carbon nanohorns.

Fig. 1

| Element | Cu | Li | Co | Mn | Ni |
|---|---|---|---|---|---|
| Wt% | 0.012 | 0.002 | 0.001 | <0.001 | 0.004 |

METHOD FOR PRODUCTION OF NITROGEN-DOPED SINGLE WALL CARBON NANOHORNS FROM ANODE GRAPHITE OF WASTED LITHIUM-ION BATTERIES

The present application claims foreign priority to Chinese Patent Application No. CN202011486809.1, titled: Method for production of nitrogen-doped single wall carbon nanohorns from anode graphite of wasted lithium-ion batteries, filed on Dec. 16, 2020 in the State Intellectual Property Office of China, and the entire contents of which is hereby incorporated by reference.

TECHNICAL FIELD

The present disclosure relates to methods for production of nitrogen-doped single wall carbon nanohorns (N-SWCNHs) from anode graphite of wasted lithium-ion batteries (LIBs), especially relates to the N-SWCNHs produced by such methods, and methods for the use thereof.

BACKGROUND

In recent years, the demand for LIBs has continued to increase, which means that there will be a large number of waste LIBs in the future. The waste LIB contains a large amount of valuable metal elements such as cobalt, nickel, manganese and lithium, as well as graphite materials, which has high economic value. Discarding a large amount of waste LIBs is not only a waste of resources, but also serious pollution to the environment. Therefore, the recycling of waste LIBs anode electrode graphite can not only realize "turning waste into treasure", but also slow down the consumption of graphite resources. At this stage, the recovery of LIBs anode electrode graphite mainly adopts acid leaching method (e.g., the solution concentration with 0.1-1 mol/L), high temperature calcination method (e.g., heating at temperatures between 450-800° C.), to remove the small amount of metal elements remaining in the anode electrode, and obtain the anode electrode graphite without impurities. These methods are harmful to the environment and consume huge energy, which makes the recovery cost of graphite quite high, and it is difficult to promote industrially. Therefore, on one hand, finding a suitable method is very important for LIBs anode graphite recovery. On the other hand, processing recycled graphite into other forms of carbon materials (e.g., carbon nanohorns) with high added value will help promote the use of recycled graphite.

DETAILED DESCRIPTION

Definition

N-doped: Nitrogen atoms are doped in the form of pyridine nitrogen and pyrrole nitrogen in the single wall carbon nanohorn.

Single wall carbon nanohorn: single wall carbon nanohorn is similar as single wall nanotube, the difference is that the top of a single carbon nanohorn is a closed structure, the single wall carbon nanohorns is a carbon material which aggregate of thousands of single carbon nanohorns. The applicants of the present disclosure have found that the single wall carbon nanohorns of the present disclosure maintains the dahlia-like structure. The N-SWCNHs is introduced with nitrogen atoms. The introduction of these nitrogen atoms increases defects and specific surface area of N-SWCNHs and brings more reactive centers while has excellent properties in various applications. In dahlia-like structure of the N-SWCNHs of the present disclosure, a spherical diameter of N-SWCNHs may be 50-80 nm.

Tap water: means the water without deionization

The diameter of N-SWCNHs: means the spherical diameter of the N-SWCNHs.

Tubular diameter of N-SWCNHs: means the diameter in carbon nanotube with closed top.

Uniformity: defines the density distribution within the spherical diameter, therefore the uniformity indices is spherical diameter uniformity. The calculation method of the uniformity is as follows: producing ten batches of N-SWCNHs under the same conditions. Each batch of products counts the size of 50 N-SWCNHs particles, the extreme value of the distribution is the uniformity. By taking an example, if the product prepared is distributed in 1-100 nm, each of 10 nanometers is defined as one interval and the extreme value of the distribution is the uniformity. For example, if the sample prepared in 70-80 nm accounts for 80% of the density distribution of the product prepared, this batch of product has a diameter of 70-80 nanometers and a uniformity of 80%.

First Aspect

A first aspect of the present disclosure relates to a method for preparing N-SWCNHs from anode graphite of wasted LIBs, the method including:

a. immersing anode electrodes of the lithium-ion batteries in water for a first preset time and the immersed liquid is tap water, this will reduce recycling costs; then separating copper foil of the anode electrode from the graphite to obtain a mixture solution including the graphite, the mixture solution is subjected to solid-liquid separation treatment and washing by washing liquid to obtain solid graphite, the washing liquid is deionized water to ensure that impurities can be removed; and the solid graphite is subjected to particle refining treatment with a speed of planetary ball mill is preferably higher than 350 r/min, using deionized water when ball milling. In that case, the powder of graphite particles can be ground finer and easier to shape;

b. molding the recycled graphite powder to obtain recycled graphite block, the pressure and pressure holding time of cold isostatic pressing device is preferably higher than 8 MPa and 1 h, respectively. In that case, graphite block is not easily broken during the work of DC arc plasma device;

c. putting graphite block as an anode into a DC arc plasma device, a graphite rod sharpened at one end as a cathode and is arranged opposite to the graphite block, filling the plasma device with preset gas, and then starting the plasma device to synthesis N-SWCNHs.

In the second step of the method of the present disclosure, the preset gas can be nitrogen gas. The nitrogen preset gas can ionize nitrogen atoms and nitrogen ion in DC arc plasma device. In that case, nitrogen atoms can partially replace carbon atoms to form a five-membered ring or seven-membered ring, resulting in an anode curvature structure, forming N-SWCNHs. The working current of DC arc plasma device is preferably higher than 150 A. In that case, production rate of N-SWCNHs and quality of N-SWCNHs can be improved.

In the present disclosure, a duration of the discharge time of the DC arc plasma device is not specifically limited as long as purpose of the present disclosure may be achieved. Generally, as long as the graphite block is not exhausted, the DC arc plasma device can be discharged continuously.

Preset gas used in the present disclosure may be pure nitrogen or nitrogen and argon mixture. In a specific embodiment, a ratio of argon to nitrogen is 0-50%, such as 0:1, such as 1:6, such as 1:5, such as 1:4. In a preferred embodiment, the ratio of argon to nitrogen is 0:1. Nitrogen atoms can partially replace carbon atoms to result in an anode curvature structure, forming N-SWCNHs.

The N-SWCNHs prepared by the method of the present disclosure has a spherical diameter of 50-80 nm, such as 50-60 nm, such as 60-70 nm, preferably 50-60 nm. The step c includes quenching, the spherical diameter of the N-SWCNHs prepared can be controlled by a quenching speed in the DC arc plasma device, and a flow rate of cooling water used in the quenching. The flow rate of cooling water is 1-5 m/s. Preferably 3-5 m/s, such as 3 m/s, such as 3.5 m/s, such as 4.5 m/s, such as 5 m/s. Tubular diameter of N-SWCNHs is 2-4 nm.

The method of the present disclosure is carried out in faster quenching rate, thus the N-SWCNHs product obtained has a very high uniformity. Generally, the uniformity of the N-SWCNHs of the present disclosure is higher than 80%, preferably higher than 90%, In the present application, under a circumstance of no specific indication, the uniformity described means spherical diameter uniformity.

The N-SWCNHs with a high uniformity especially exhibits great practicability in applications. For example, when the N-SWCNHs of the present disclosure is applied to drug carrier materials, the efficiency of body's absorption of drugs can be improved.

The N-SWCNHs obtained by the method of the present disclosure has a content of nitrogen atom is about 2-2.5%. A term of "content of nitrogen atoms" used in the present disclosure means the ratio of nitrogen atoms to the total number atoms, that is, the molar ratio thereof in the N-SWCNHs. Generally, the nitrogen doped content of the N-SWCNHs may be controlled by controlling the preset gas composition. Specifically, the higher proportion of nitrogen in the process of producing N-SWCNHs, the higher the content of nitrogen atoms, vice versa. For example, when the ratio of argon to nitrogen is 0:1, the content of nitrogen atoms in N-SWCNHs is 2.48%, when the ratio of argon to nitrogen is 1:4, the content of nitrogen atoms in N-SWCNHs is 2.26%. When the content of nitrogen atoms is higher, the N-SWCNHs has higher number of defects resulting in a high $I_D/I_G$ vale and specific surface area. Further increase catalytically active sites, vice versa. The N-SWCNHs obtained by the method of the present disclosure has an excellent ability to catalyze carbon dioxide.

Second Aspect

A second aspect of the present disclosure relates to a N-SWCNHs product, wherein the N-SWCNHs is provided with pyrrole nitrogen and is characterized in that: the content of nitrogen atoms is about 2-2.5%. The terms "content of nitrogen atoms" used in the present disclosure means the ratio of nitrogen atoms to the total number of atoms, that is, the molar ratio thereof, in the N-SWCNHs obtained.

The content of nitrogen atom reflects amount of pyrrole nitrogen connected in the N-SWCNHs. When the content of nitrogen atoms is higher, the N-SWCNHs has higher amount of pyrrole nitrogen, vice versa. The N-SWCNHs obtained by the method of the present disclosure has an $I_D/I_G$ vale of 1.02-1.08 a specific surface area of 210-230 m$^2$/g. Preferably higher than 1.05 and 215 m$^2$/g.

In a specific embodiment, the N-SWCNHs of the present disclosure has a spherical diameter, i.e., a spherical diameter of the N-SWCNHs, preferably smaller than 80 nm. In a specific embodiment, the N-SWCNHs of the present disclosure has a tubular diameter, i.e., the diameter in carbon nanotube with closed top, of 2-4 nm. In a preferred embodiment, the N-SWCNHs has a spherical diameter uniformity of more than 80%. In a more preferred embodiment, the N-SWCNHs has a spherical diameter uniformity of more than 90%.

Third Aspect

A third aspect of the present disclosure relates to use of the N-SWCNHs product of the present disclosure or the N-SWCNHs obtained by the method of the present disclosure. The N-SWCNHs product prepared by the present disclosure can be used in various known carbon nanotube applications, but is broader than it. The N-SWCNHs has a very wide material application range. The N-SWCNHs is a new type of carbon material with excellent performances, with a high specific surface area and no metal impurities. Currently, the N-SWCNHs of the present disclosure may be applied in carbon dioxide catalysis, catalyst carrier, supercapacitors, fuel cells, solar cells, biocarrier, biological sensor, gas sensor, gas storage, composite material or photosensitive elements.

Example 9 of the present disclosure illustrates use of the N-SWCNHs of the present disclosure in Na—CO$_2$ battery, wherein the N-SWCNHs of the present disclosure have excellent carbon dioxide adsorption capacity and nitrogen heteroatoms, containing more catalytically active pyrrole nitrogen, therefore the carbon dioxide reduction ability significantly improved. This effect is obviously superior to that of nitrogen-doped single-walled carbon nanotubes in prior art.

EXAMPLES

In the examples in the present application, some following raw materials are used; other raw materials are conventional or commercially available.

TABLE 1

| Raw material | Source | Property remark |
|---|---|---|
| Anode of the wasted LIBs | Tianjin Saidemei New Energy Technology Co., Ltd. | 14.2 cm in length, 8.3 cm in width |
| Graphite rod | Beijing Jinglong Special Carbon Technology Co., Ltd. | Φ10 × 300 mm Purity: 99.77% |

Test Methods

N-SWCNHs (the characterization thereof): N-SWCNHs may be characterized by infrared spectrum, Raman spectrum, transmission electron microscope (TEM), scanning electron microscope (SEM), Brunner-Emmet-Teller (BET) measurements, X-ray photoelectron spectroscopy (XPS) and other methods. In the present application, the N-SWCNHs is characterized mainly by Raman spectrum, transmission electron microscope and Brunner-Emmet-Teller measurements, wherein there are D peak and G peak at 1350 $cm^{-1}$, 1580 $cm^{-1}$ and 2700 $cm^{-1}$ in Raman spectrum; The specific surface area, total pore volume and average pore size Spherical diameter: The spherical diameter of the N-SWCNHs may be measured by TEM, SEM and other methods. The results measured by these methods are similar. In the present disclosure, the spherical diameter is measured mainly by SEM and TEM.

Tubular diameter: The tubular diameter of the N-SWCNHs may be measured by TEM, SEM and other methods. In the present disclosure, the spherical diameter is measured mainly by TEM.

Specific surface area: In the present disclosure, the specific surface area, total pore volume and average pore size may be measured by BET.

Surface element distribution: In the present disclosure, the surface element distribution may be measured by HAADF. These measuring methods are well known by a person skilled in the art.

The content of nitrogen atoms: The content of nitrogen atoms in N-SWCNHs may be measured by elemental analysis, XPS and other methods. In the present disclosure, the spherical diameter is measured mainly by SEM and TEM.

Uniformity: the uniformities in terms of spherical of the N-SWCNHs may be determined based on the spherical diameter as measured above by the following steps: Each batch of products counts the size of 50 N-SWCNHs particles, the extreme value of the distribution is the uniformity. By taking an example, if the product prepared is distributed in 1-100 nm, each of 10 nm is defined as one interval and the extreme value of the distribution is the uniformity. For example, if the sample prepared in 70-80 nm accounts for 80% of the density distribution of the product prepared, this batch of product has a diameter of 70-80 nm and a uniformity of 80%.

Example 1

Completely immerse the anode electrode of wasted LIBs in tap water and soak for 5 h; then use a magnetic stirrer to stir to separate the copper foil from the graphite at a speed of 250 r/min, and then perform suction filtration and deionization rinse with deionized water 2 times to obtain filtered graphite, ball mill the filtered graphite with a planetary ball mill at a speed of 350 r/min for 18 h, and then dry it in a blast drying box at 70° C. for 12 h to obtain recycled graphite powder;

Put the recycled graphite powder into a mold, and perform cold isostatic pressing at a pressure of 10 MPa and holding the pressure for 1 h to obtain graphite block;

Put the graphite block as an anode into a carbon crucible, a graphite rod sharpened at one end as a cathode, and perform plasma treatment in a 70 KPa (Ar: $N_2$=0:1) atmosphere. The working current is 200 A. The flow rate of cooling water is 5 m/s. Finally, the N-SWCNHs were obtained, which is put in a dry environment for storage.

Figure 1:
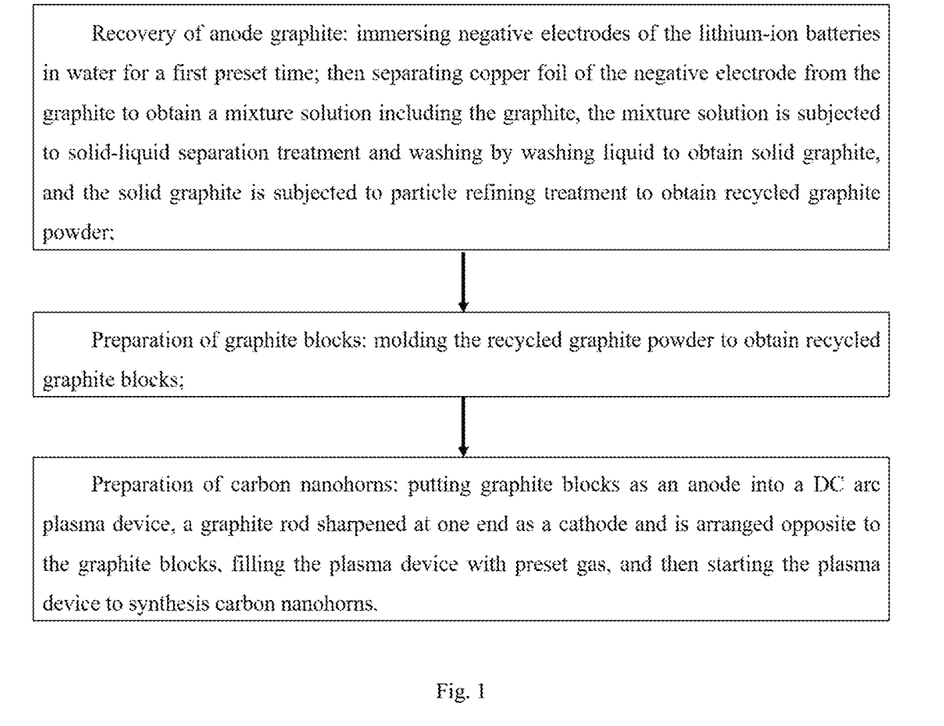
FIG. 1 is a flow chart showing a method of synthesizing N-SWCNHs with recycled graphite from wasted LIBs.
Figure 2:
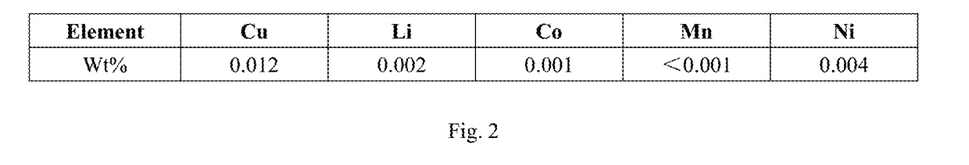
FIG. 2 is impurity content of the recycled graphite recycled from the anodes of waste LIB s.

Before a specific embodiment, the graphite of wasted LIBs has been characterized by XRD and Inductively coupled plasma atomic emission spectrometry (ICP-OES). It indicates the graphite recycled from the anode of waste lithium-ion batteries has low impurity content, the highest content impurity element is copper, only 0.012% (detail data are shown in table 1), it means a little amount of impurities has no effect on the synthesis of N-SWCNHs. FIG. 2 provides X-ray diffraction (XRD) image of recycled graphite from wasted LIBs. The XRD indicates the graphite recycled from the anode of waste LIBs still retains a pristine graphite structure.

Figure 3:
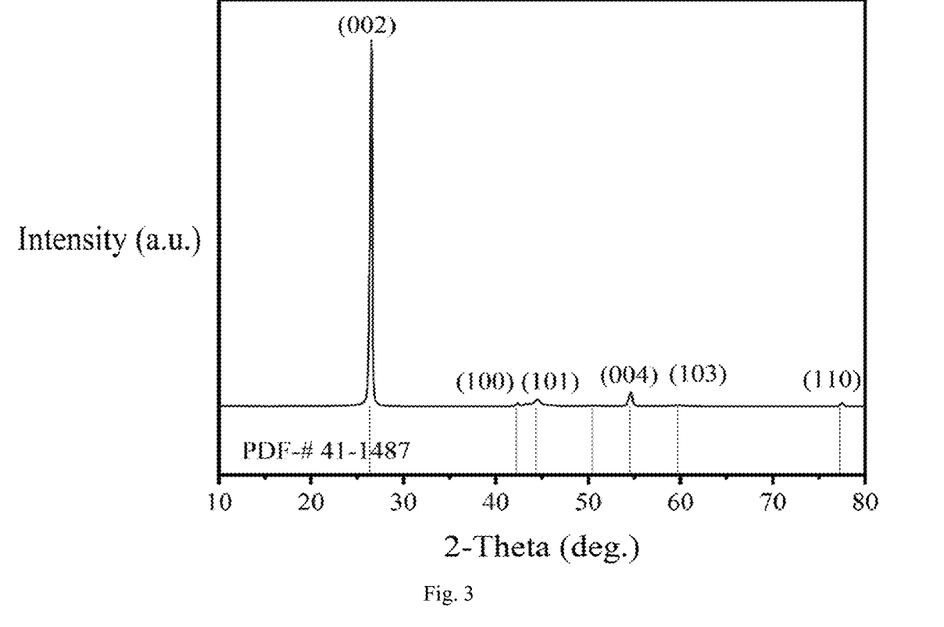
FIG. 3 is an X-ray diffraction (XRD) image of the recycled graphite from LIBs.

The characterization of the N-SWCNHs: by characterizing by XRD, it is found that there are two peaks at 2θ=21° and 26° in XRD (FIG. 3) and obvious D, G and 2D peaks characteristic of carbon material in Raman spectrum; by characterizing by TEM, the N-SWCNHs are single wall structure; and it is found by measurements that the N-SWCNHs has a spherical diameter of 50-64 nm, a tubular diameter of 2-4 nm and a spherical diameter uniformity of 90% in this range; and a content of nitrogen atoms of 2.5%; and an $I_D/I_G$ vale of 1.08; and a specific surface area of 230 $m^2/g$.

Example 2

Completely immerse the anode electrode of wasted LIBs in tap water and soak for 6 h; then use a magnetic stirrer to stir at a speed of 150 r/min to separate the copper foil from the graphite, and then perform suction filtration and deionization rinse with deionized water two times to obtain filtered graphite, ball mill the filtered graphite with a planetary ball mill at a speed of 500 r/min for 8 h, and then dry it in a blast drying box at 80° C. for 10 h to obtain recycled graphite powder;

Put the recycled graphite powder into a mold, and perform cold isostatic pressing at a pressure of 8 MPa and holding the pressure for 2 h to obtain graphite block;

Put the graphite block as an anode into a carbon crucible, a graphite rod sharpened at one end as a cathode, and perform plasma treatment in an 80 KPa (Ar: $N_2$=1:5) atmosphere. The working current is 150 A. The flow rate of cooling water is 5 m/s. Finally, the N-SWCNHs were obtained, which is put in a dry environment for storage.

The characterization of the N-SWCNHs: by characterizing by XRD, it is found that there are two peaks at 2θ=21° and 26° in XRD and obvious D, G and 2D peaks characteristic of carbon material at 1350 $cm^{-1}$, 1580 $cm^{-1}$ and 2700 $cm^{-1}$ in Raman spectrum; it is found by measurements that the N-SWCNHs has a spherical diameter of 50-64 nm, a tubular diameter of 2-4 nm and a spherical diameter uniformity of 87% in this range; and a content of nitrogen atoms of 2.3%; and an $I_D/I_G$ vale of 1.06; and a specific surface area of 217 $m^2/g$.

Example 3

Completely immerse the anode electrode of wasted LIBs in tap water and soak for 6 h; then use a magnetic stirrer to separate the copper foil from the graphite at a speed of 150 r/min, and then perform suction filtration and deionization rinse with deionized water two times, ball mill the filtered graphite with a planetary ball mill at a speed of 500 r/min for 8 h, and then dry it in a blast drying box at 90° C. for 8 h to obtain recycled graphite powder;

Put the recycled graphite powder into a mold, and perform cold isostatic pressing at a pressure of 9 MPa and holding the pressure for 1.5 h to obtain graphite block;

Put the graphite block as an anode into a carbon crucible, a graphite rod sharpened at one end as a cathode, and perform plasma treatment in a 70 KPa (Ar: $N_2$=1:6) atmosphere. The working current is 175 A. The flow rate of cooling water is 5 m/s. Finally, the N-SWCNHs were obtained, which is put in a dry environment for storage.

The characterization of the N-SWCNHs: by characterizing by XRD, it is found that there are two peaks at 2θ=21° and 26° in XRD and obvious D, G and 2D peaks characteristic of carbon material at 1350 cm$^{-1}$, 1580 cm$^{-1}$ and 2700 cm$^{-1}$ in Raman spectrum; it is found by measurements that the N-SWCNHs has a spherical diameter of 50-64 nm, a tubular diameter of 2-4 nm and a spherical diameter uniformity of 89% in this range; and a content of nitrogen atoms of 2.2%; and an $I_D/I_G$ vale of 1.05; and a specific surface area of 224 m$^2$/g.

Example 4

Completely immerse the anode electrode of wasted LIBs in tap water and soak for 7 h; then use a magnetic stirrer to separate the copper foil from the graphite at a speed of 250 r/min, and then perform suction filtration and deionization rinse with deionized water two times, ball mill the filtered graphite with a planetary ball mill at a speed of 500 r/min for 8 h, and then dry it in a blast drying box at 90° C. for 8 h to obtain recycled graphite powder;

Put the recycled graphite powder into a mold, and perform cold isostatic pressing at a pressure of 10 MPa and holding the pressure for 1 h to obtain graphite block;

Put the graphite block as an anode into a carbon crucible, a graphite rod sharpened at one end as a cathode, and perform plasma treatment in a 70 KPa (Ar: $N_2$=1:4) atmosphere. The working current is 150 A. The flow rate of cooling water is 4 m/s. Finally, the N-SWCNHs were obtained, which is put in a dry environment for storage.

The characterization of the N-SWCNHs: by characterizing by XRD, it is found that there are two peaks at 2θ=21° and 26° in XRD and obvious D, G and 2D peaks characteristic of carbon material at 1350 cm$^{-1}$, 1580 cm$^{-1}$ and 2700 cm$^{-1}$ in Raman spectrum; it is found by measurements that the N-SWCNHs has a spherical diameter of 52-68 nm, a tubular diameter of 2-4 nm and a spherical diameter uniformity of 88% in this range; and a content of nitrogen atoms of 2%; and an $I_D/I_G$ vale of 1.02; and a specific surface area of 214 m$^2$/g.

Example 5

Completely immerse the anode electrode of wasted LIBs in tap water and soak for 6 h; then use a magnetic stirrer to separate the copper foil from the graphite at a speed of 250 r/min, and then perform suction filtration and deionization rinse with deionized water two times, ball mill the filtered graphite with a planetary ball mill at a speed of 500 r/min for 8 h, and then dry it in a blast drying box at 90° C. for 8 h to obtain recycled graphite powder;

Put the recycled graphite powder into a mold, and perform cold isostatic pressing at a pressure of 10 MPa and holding the pressure for 1 h to obtain graphite block;

Put the graphite block as an anode into a carbon crucible, a graphite rod sharpened at one end as a cathode, and perform plasma treatment in an 80 KPa (Ar: $N_2$=1:5) atmosphere. The working current is 175 A. The flow rate of cooling water is 4 m/s. Finally, the N-SWCNHs were obtained, which is put in a dry environment for storage.

The characterization of the N-SWCNHs: by characterizing by XRD, it is found that there are two peaks at 2θ=21° and 26° in XRD and obvious D, G and 2D peaks characteristic of carbon material at 1350 cm$^{-1}$, 1580 cm$^{-1}$ and 2700 cm$^{-1}$ in Raman spectrum; it is found by measurements that the N-SWCNHs has a spherical diameter of 52-68 nm, a tubular diameter of 2-4 nm and a spherical diameter uniformity of 86% in this range; and a content of nitrogen atoms of 2.3%; and an $I_D/I_G$ vale of 1.04; and a specific surface area of 215 m$^2$/g.

Example 6

Completely immerse the anode electrode of wasted LIBs in tap water and soak for 5 h; then use a magnetic stirrer to separate the copper foil from the graphite at a speed of 250 r/min, and then perform suction filtration and deionization rinse with deionized water 2 times, ball mill the filtered graphite with a planetary ball mill at a speed of 500 r/min for 8 h, and then dry it in a blast drying box at 90° C. for 8 h to obtain recycled graphite powder;

Put the recycled graphite powder into a mold, and perform cold isostatic pressing at a pressure of 10 MPa and holding the pressure for 1 h to obtain graphite block;

Put the graphite block as an anode into a carbon crucible, a graphite rod sharpened at one end as a cathode, and perform plasma treatment in an 80 KPa (Ar: $N_2$=1:5) atmosphere. The working current is 200 A. The flow rate of cooling water is 3 m/s. Finally, the N-SWCNHs were obtained, which is put in a dry environment for storage.

The characterization of the N-SWCNHs: by characterizing by XRD, it is found that there are two peaks at 2θ=21° and 26° in XRD and obvious D, G and 2D peaks characteristic of carbon material at 1350 cm$^{-1}$, 1580 cm$^{-1}$ and 2700 cm$^{-1}$ in Raman spectrum; it is found by measurements that the N-SWCNHs has a spherical diameter of 57-72 nm, a tubular diameter of 2-4 nm and a spherical diameter uniformity of 85% in this range; and a content of nitrogen atoms of 2.3%; and an $I_D/I_G$ vale of 1.06; and a specific surface area of 213 m$^2$/g.

Example 7

Completely immerse the anode electrode of wasted LIBs in tap water and soak for 4 h; then use a magnetic stirrer to separate the copper foil from the graphite at a speed of 250 r/min, and then perform suction filtration and deionization rinse with deionized water two times, ball mill the filtered graphite with a planetary ball mill at a speed of 500 r/min for 8 h, and then dry it in a blast drying box at 90° C. for 8 h to obtain recycled graphite powder;

Put the recycled graphite powder into a mold, and perform cold isostatic pressing at a pressure of 10 MPa and holding the pressure for 1 h to obtain graphite block;

Put the graphite block as an anode into a carbon crucible, a graphite rod sharpened at one end as a cathode, and perform plasma treatment in a 90 KPa (Ar: $N_2$=1:5) atmosphere. The working current is 150 A. The flow rate of cooling water is 2 m/s. Finally, the N-SWCNHs were obtained, which is put in a dry environment for storage.

The characterization of the N-SWCNHs: by characterizing by XRD, it is found that there are two peaks at 2θ=21° and 26° in XRD obvious D, G and 2D peaks characteristic of carbon material at 1350 cm$^{-1}$, 1580 cm$^{-1}$ and 2700 cm$^{-1}$ in Raman spectrum; it is found by measurements that the N-SWCNHs has a spherical diameter of 62-75 nm, a tubular diameter of 2-4 nm and a spherical diameter uniformity of 87% in this range; and a content of nitrogen atoms of 2.3%; and an $I_D/I_G$ vale of 1.05; and a specific surface area of 213 m$^2$/g.

Example 8

Completely immerse the anode electrode of wasted LIBs in tap water and soak for 2 h; then use a magnetic stirrer to separate the copper foil from the graphite at a speed of 250 r/min, and then perform suction filtration and deionization rinse with deionized water two times, ball mill the filtered graphite with a planetary ball mill at a speed of 500 r/min for 8 h, and then dry it in a blast drying box at 90° C. for 8 h to obtain recycled graphite powder;

Put the recycled graphite powder into a mold, and perform cold isostatic pressing at a pressure of 8 MPa and holding the pressure for 2 h to obtain graphite block;

Put the graphite block as an anode into a carbon crucible, a graphite rod sharpened at one end as a cathode, and perform plasma treatment in a 90 KPa (Ar: N$_2$=1:5) atmosphere. The working current is 175 A. The flow rate of cooling water is 1 m/s. Finally, the N-SWCNHs were obtained, which is put in a dry environment for storage.

The characterization of the N-SWCNHs: by characterizing by XRD, it is found that there are two peaks at 2θ=21° and 26° in XRD obvious D, G and 2D peaks characteristic of carbon material at 1350 cm$^{-1}$, 1580 cm$^{-1}$ and 2700 cm$^{-1}$ in Raman spectrum; it is found by measurements that the N-SWCNHs has a spherical diameter of 66-80 nm, a tubular diameter of 2-4 nm and a spherical diameter uniformity of 86% in this range; and a content of nitrogen atoms of 2.4%; and an $I_D/I_G$ vale of 1.05; and a specific surface area of 210 m$^2$/g.

Example 9

Figure 4:
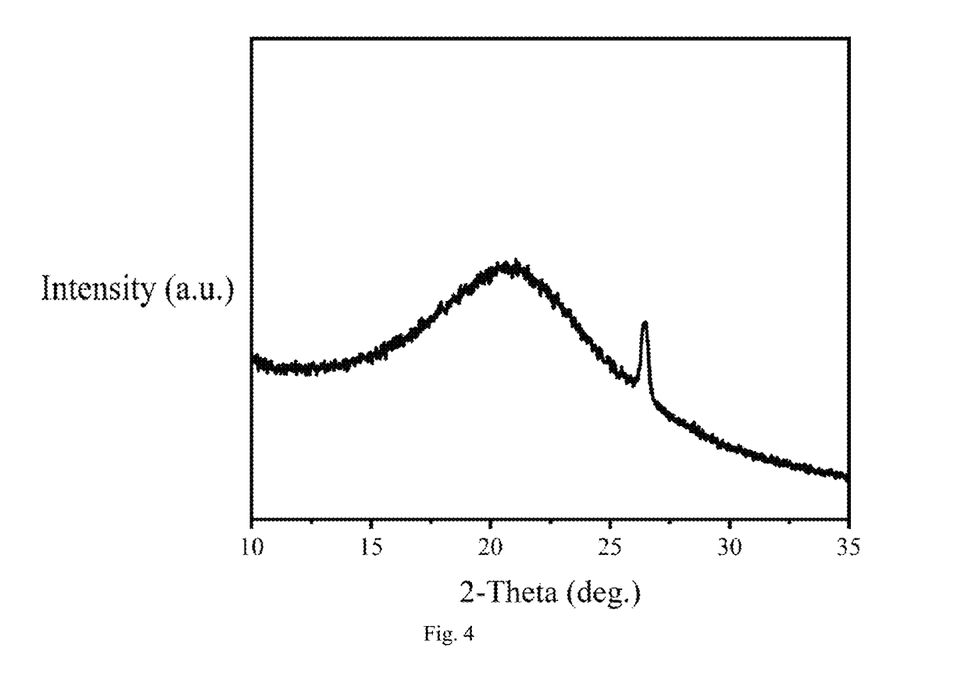
FIG. 4 is an X-ray diffraction (XRD) image of N-SWCNHs.
Figure 5:
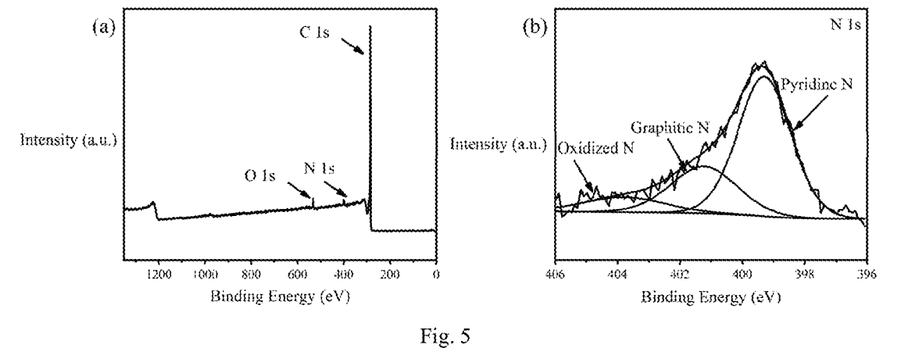
FIG. 5 are X-ray photoelectron spectroscopy (XPS) of N-SWCNHs.
Figure 6:
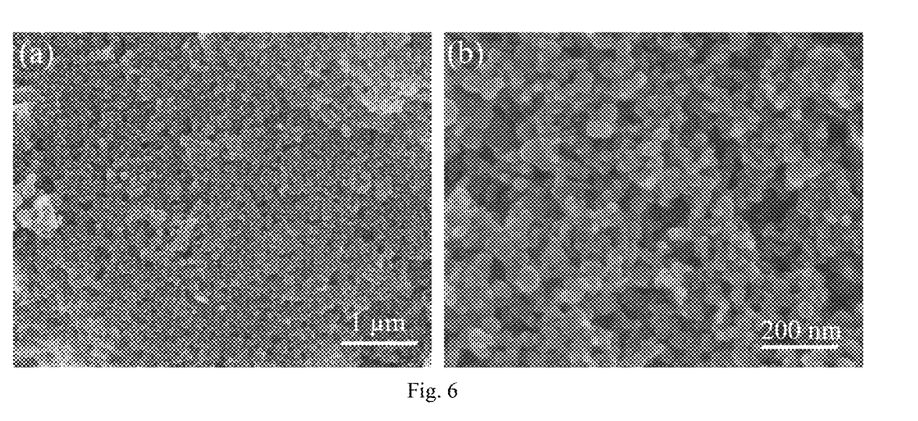
FIG. 6 are scanning electron microscopy (SEM) images of N-SWCNHs.
Figure 7:
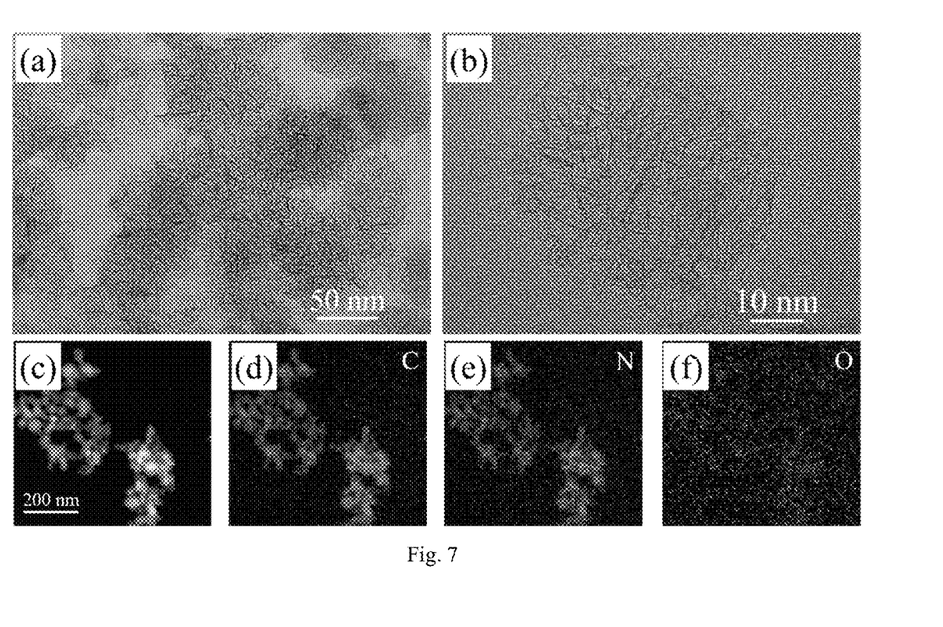
FIG. 7 are transmission electron microscopy (TEM) images of N-SWCNHs.
Figure 8:
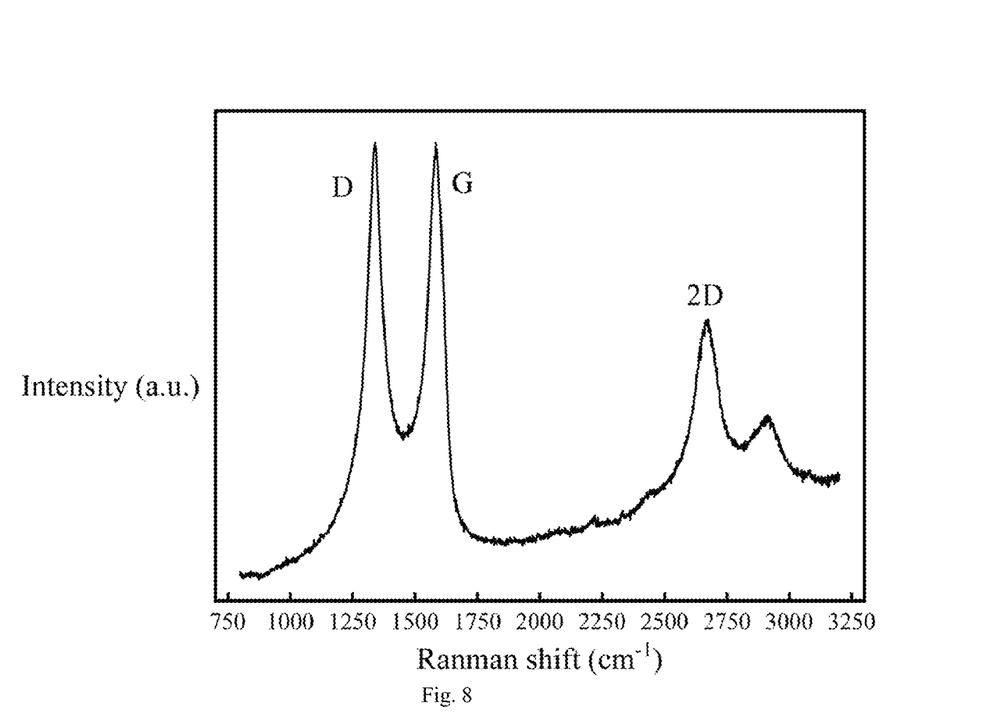
FIG. 8 is Raman spectrometry of N-SWCNHs.
Figure 9:
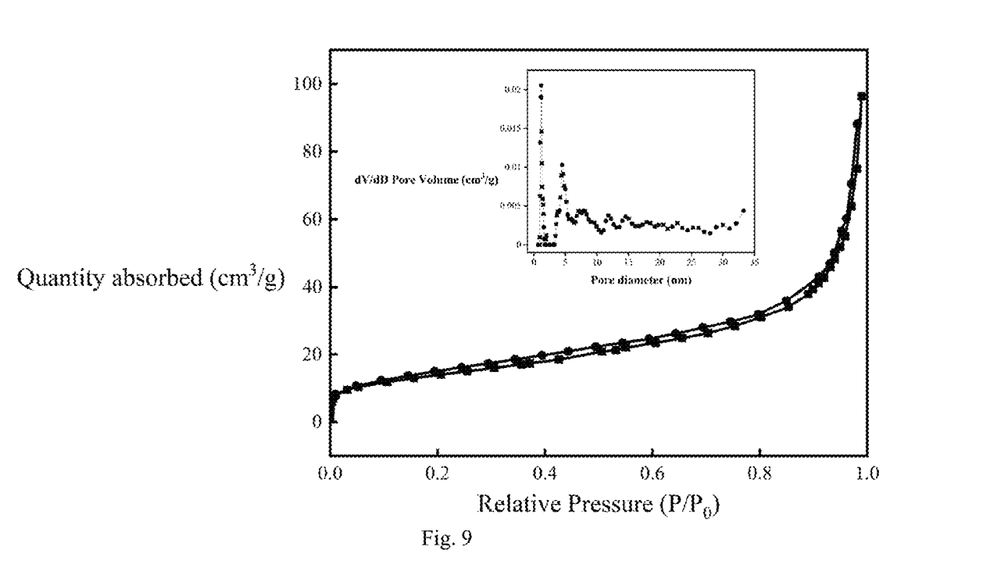
FIG. 9 is Brunner-Emmet-Teller (BET) measurements of N-SWCNHs.
Figure 10:
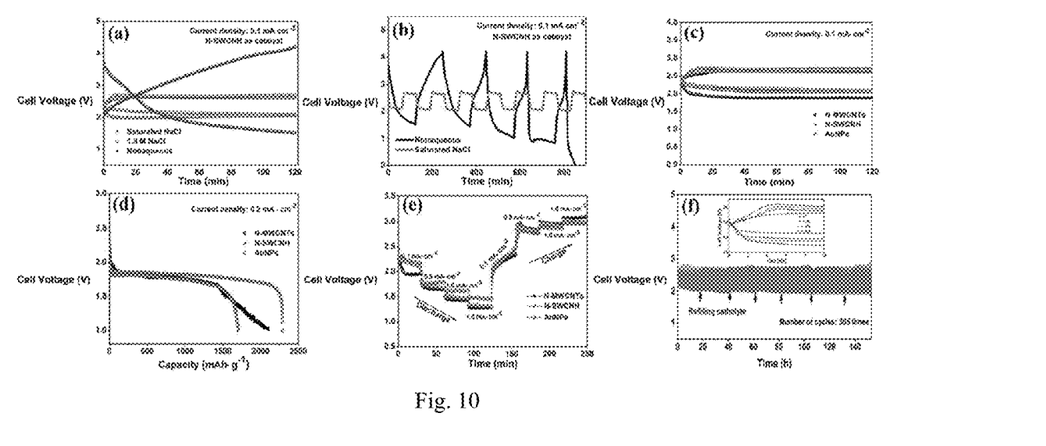
FIG. 10 are electrochemical performances of proposed Na—$CO_2$ batteries: (a) discharge-charge voltage curves with different catholytes at a current density of 0.1 mA/$cm^2$, (b) cycling performance with different catholytes at a current density of 0.1 mA/$cm^2$, (c) discharge-charge voltage curves with nitrogen-doped multi-walled carbon nanotubes (N-MWCNTs), Au nanoparticles (AuNPs), and N-SWCNHs as catalyst at a current density of mA/$cm^2$, (d) discharge capacities curves at a current density of 0.2 mA/$cm^2$, (e) discharge and charge voltage profiles at different current densities, (f) the cycling performance of hybrid Na—$CO_2$ battery with N-SWCNH as catalyst at a current density of 0.1 mA/$cm^2$.

Completely immerse the anode electrode of wasted LIBs in tap water and soak for 3 h; then use a magnetic stirrer to separate the copper foil from the graphite at a speed of 250 r/min, and then perform suction filtration and deionization rinse with deionized water 2 times, ball mill the filtered graphite with a planetary ball mill at a speed of 500 r/min for 8 h, and then dry it in a blast drying box at 90° C. for 8 h to obtain recycled graphite powder;

Put the recycled graphite powder into a mold, and perform cold isostatic pressing at a pressure of 10 MPa and holding the pressure for 1 h to obtain graphite block;

Put the graphite block as an anode into a carbon crucible, a graphite rod sharpened at one end as a cathode, and perform plasma treatment in a 90 KPa (Ar: N$_2$=0:1) atmosphere. The working current is 200 A. The flow rate of cooling water is 5 m/s. Finally, the N-SWCNHs were obtained, which is put in a dry environment for storage. The characterization of the N-SWCNHs: by characterizing by XRD, Raman spectrum, other characterization. In detail FIG. 4 provides X-ray photoelectron spectroscopy (XPS) of N-SWCNHs. The he XPS indicates 2.37 atomic % of N and 3.34 atomic % of O in the N-SWCNHs. The appearance of oxygen is mainly due to the adsorption of water molecules in the air and part of the hydroxyl functional groups in the N-SWCNHs. The N1s XPS peaks were taken from N-SWCNHs. The N1s core splits into three main peaks of 399.28, 401.28 and 403.98 eV, reflects three different chemical environments: pyrrolic nitrogen (N-5), graphitic nitrogen atoms and oxidized nitrogen. FIG. 5a provides a scanning electron microscopy (SEM) image of N-SWCNHs at a scale bar of 1 μm. FIG. 5b provides an SEM image of N-SWCNHs at a scale bar of 200 nm. It indicates that the size of N-SWCNHs is in the nanometer scale, the size is uniform, and the N-SWCNHs are spherical. FIG. 6a provides a transmission electron microscopy (TEM) image of the N-SWCNHs at a scale bar of 50 nm. It shows that the N-SWCNHs have a dahlia-like structure, and the diameter is about 50 nm to about 64 nm, and the N-SWCNHs has a spherical diameter uniformity of 90%. FIG. 6b provides a TEM image of the N-SWCNHs at a scale bar of 10 nm. It indicates that the N-SWCNHs are aggregates of many single horn-like structures with closed ends. And the tubular diameter of the N-SWCNHs is about 2 nm to about 4 nm. FIG. 6c provides a HADDF image of the N-SWCNHs at a scale bar of 200 nm. FIG. 6d indicates that the carbon element in N-SWCNHs. FIG. 6e indicates that the nitrogen element in N-SWCNHs. FIG. 6f indicates that the oxygen element in N-SWCNHs. They indicate that the elements in the N-SWCNHs are evenly distributed. FIG. 7 provides Raman spectrometry of N-SWCNHs. It indicates that the N-SWCNHs have typical characteristic peaks of Raman spectra of carbon materials. Including the main peaks of 1350 cm$^{-1}$, 1580 cm$^{-1}$ and 2700 cm$^{-1}$, correspond to the D peak, G peak and G' peak. The $I_D/I_G$ of N-SWCNHs is 1.08, this indicates that the degree of graphitization is low, which is attributed to the defects and disorder degree caused by nitrogen doping. FIG. 8 provides the Brunner-Emmet-Teller (BET) measurements of N-SWCNHs. It indicates that the specific surface area, total pore volume and average pore size of N-SWCNHs are 230 m$^2$/g, 0.25 cm$^3$/g and 8.3 nm respectively. In addition, the N-SWCNHs of the present disclosure used in the Na—CO$_2$ battery, and the electrochemical test is carried out, as shown in FIG. 9

Example 10

The experiment of Example 1 is repeated except that the proportion of nitrogen is adjusted to look for the relationship between the proportion of argon to nitrogen and content of nitrogen atoms of N-SWCNHs. The test results obtained is shown in the following table (Under the same gas pressure Ar: N$_2$=0:1).

TABLE 1

| | Ar: N$_2$ | | | |
|---|---|---|---|---|
| | 1:4 | 1:5 | 1:6 | 0:1 |
| Nitrogen atom content | 2.03 % | 2.15% | 2.29 | 2.48 |

Example 11

The experiment of Example 1 is repeated except that the flow rate of cooling water is adjusted to look for the relationship between the spherical diameter and quenching rate of N-SWCNHs. The test results obtained is shown in the following table.

TABLE 2

| Cooling water flow rate | 1 m/s | 2 m/s | 3 m/s | 4 m/s | 5 m/s |
|---|---|---|---|---|---|
| Spherical diameter | 66-80 nm | 62-75 nm | 57-72 nm | 52-68 nm | 50-64 nm |

What is claimed is:

1. A method for production of nitrogen-doped single wall carbon nanohorns from anode graphite of wasted lithium-ion batteries, the method comprising:
   a. immersing anode electrodes of the lithium-ion batteries in water for a first preset time; then separating copper foil of the anode electrode from graphite to obtain a mixture solution including the graphite, the mixture solution is subjected to solid-liquid separation treatment and washed by washing liquid to obtain solid graphite, and the solid graphite is subjected to particle refining treatment to obtain recycled graphite powder;
   b. molding the recycled graphite powder to obtain recycled graphite blocks; and
   c. putting graphite blocks as an anode into a DC arc plasma device, a graphite rod sharpened at one end as a cathode and is arranged opposite to the graphite block, filling the plasma device with preset gas, and then starting the plasma device to synthesis nitrogen-doped single wall carbon nanohorns.

2. The method of claim 1, wherein the water for immersing the anode electrodes of the lithium-ion batteries is tap water; the washing liquid is deionized water.

3. The method of claim 1, wherein the solid-liquid separation treatment comprises stirring with a magnetic stirrer to separate the copper foil of the anode electrode from the graphite.

4. The method of claim 3, wherein a rotational speed of the magnetic stirrer from 150 r/min to 250 r/min.

5. The method of claim 1, wherein the particle refining treatment adopts a planetary ball mill for ball milling in ball milling liquid.

6. The method of claim 5, wherein the ball milling liquid is deionized water.

7. The method of claim 5, wherein a rotation speed of the planetary ball mill from 350 r/min to 500 r/min.

8. The method of claim 1, further comprising drying the recycled graphite powder in a blast drying oven.

9. The method of claim 8, wherein temperature in the blast drying oven is from 60° C. to 90° C.

10. The method of claim 8, wherein the drying time is in from 8 h to 12 h.

11. The method of claim 1, wherein the molding is a cold isostatic pressing process.

12. The method of claim 11, wherein a pressure holding time in the molding is from 1 h to 2 h.

13. The method of claim 11, wherein a pressure in the molding is 8 MPa to 10 MPa.

14. The method of claim 1, wherein the nitrogen-doped single wall carbon nanohorns are synthesized by DC arc plasma.

15. The method of claim 14, wherein the preset gas is nitrogen; the DC arc plasma device is filled with the preset gas at a pressure from 70 KPa to 90 KPa.

16. The method of claim 14, wherein a working current of the DC arc plasma device is 150 A to 200 A.

17. The method of claim 14, wherein synthesis of the nitrogen-doped single wall carbon nanohorns further comprises quenching, a flow rate of cooling water used in the quenching is 1-5 m/s.

* * * * *